(12) United States Patent
Singh et al.

(10) Patent No.: US 9,882,854 B2
(45) Date of Patent: Jan. 30, 2018

(54) EMAIL PARKING LOT

(71) Applicant: Microsoft Technology Licensing, LLC, Redmond, WA (US)

(72) Inventors: Jaskaran Singh, Redmond, WA (US); Szymon Madejczyk, Sammamish, WA (US); Roberto Ribeiro da Fonseca Mendes, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 95 days.

(21) Appl. No.: 14/842,036

(22) Filed: Sep. 1, 2015

(65) Prior Publication Data

US 2017/0063766 A1   Mar. 2, 2017

(51) Int. Cl.
*G06F 15/16* (2006.01)
*H04L 12/58* (2006.01)
*H04L 29/06* (2006.01)
*G06Q 10/10* (2012.01)

(52) U.S. Cl.
CPC .......... *H04L 51/22* (2013.01); *G06Q 10/10* (2013.01); *H04L 51/12* (2013.01); *H04L 67/42* (2013.01)

(58) Field of Classification Search
CPC ......... H04L 51/22; H04L 51/12; H04L 67/42; G06Q 10/10
USPC ........................................................ 709/206
See application file for complete search history.

(56) References Cited

U.S. PATENT DOCUMENTS

| 4,653,048 | A | 3/1987 | Anderson et al. |
|---|---|---|---|
| 5,197,000 | A | 3/1993 | Vincent |
| 5,813,013 | A | 9/1998 | Shakib et al. |
| 5,905,863 | A | 5/1999 | Knowles et al. |
| 6,272,074 | B1 | 8/2001 | Winner |
| 7,016,909 | B2 | 3/2006 | Chan et al. |
| 7,108,173 | B1 | 9/2006 | Wang et al. |
| 7,343,312 | B2 | 3/2008 | Capek et al. |
| 7,370,282 | B2 | 5/2008 | Cary |
| 7,490,089 | B1 * | 2/2009 | Georgiev .............. G06F 11/203 |
| 7,499,942 | B2 | 3/2009 | Simison et al. |
| 7,743,098 | B2 | 6/2010 | Anglin et al. |
| 7,818,377 | B2 | 10/2010 | Whitney |
| 7,865,872 | B2 | 1/2011 | Chamieh et al. |

(Continued)

FOREIGN PATENT DOCUMENTS

WO   WO9922324   5/1999

OTHER PUBLICATIONS

International Search Report and Written Opinion issued in PCT Application No. PCT/US2016/049346 dated Oct. 24, 2016.

(Continued)

*Primary Examiner* — Wing F Chan
*Assistant Examiner* — Joseph Maniwang
(74) *Attorney, Agent, or Firm* — Workman Nydegger (57) ABSTRACT

Ordering a series of messages when there is a possibility that the messages will be received out of order. A method includes receiving a plurality of messages in a series of messages. Each of the messages in the plurality of messages is stored in a temporary storage container; in anticipation of receiving a master message. A master message is received. The master message defines an ordering for the plurality of messages. The messages in the series of message from the temporary storage to a destination container accessible by a user according to the ordering defined in the master message.

14 Claims, 6 Drawing Sheets

(56) References Cited

U.S. PATENT DOCUMENTS

| | | | |
|---|---|---|---|
| 8,495,656 | B2 | 7/2013 | Johnson et al. |
| 8,577,959 | B2 | 11/2013 | Pandey et al. |
| 8,612,876 | B2 | 12/2013 | Barnett et al. |
| 8,838,461 | B2 | 9/2014 | Beebe et al. |
| 8,850,330 | B2 | 9/2014 | Coppinger et al. |
| 8,924,269 | B2 | 12/2014 | Seubert et al. |
| 2003/0154116 | A1 | 8/2003 | Lofton |
| 2003/0225732 | A1 | 12/2003 | Chan et al. |
| 2003/0233265 | A1 | 12/2003 | Lee et al. |
| 2005/0192857 | A1 | 9/2005 | Levine |
| 2005/0222971 | A1 | 10/2005 | Cary |
| 2006/0031311 | A1 | 2/2006 | Whitney et al. |
| 2006/0200374 | A1 | 9/2006 | Nelken |
| 2007/0005409 | A1 | 1/2007 | Boss et al. |
| 2007/0079260 | A1 | 4/2007 | Bhogal et al. |
| 2007/0150503 | A1 | 6/2007 | Simison et al. |
| 2008/0114636 | A1 | 5/2008 | Nellutla |
| 2008/0147469 | A1 | 6/2008 | Murillo et al. |
| 2008/0168146 | A1 | 7/2008 | Fletcher |
| 2009/0018878 | A1 | 1/2009 | Baron et al. |
| 2009/0248474 | A1 | 10/2009 | Fried et al. |
| 2010/0254389 | A1* | 10/2010 | Singh ............... H04L 12/5885 370/394 |
| 2010/0257404 | A1* | 10/2010 | Singh ............... G06F 11/0715 714/19 |
| 2010/0262926 | A1 | 10/2010 | Gupta et al. |
| 2011/0015961 | A1 | 1/2011 | Chan |
| 2011/0054976 | A1 | 3/2011 | Adler et al. |
| 2011/0202999 | A1 | 8/2011 | Logan et al. |
| 2011/0225015 | A1 | 9/2011 | Spivack et al. |
| 2011/0247017 | A1 | 10/2011 | Hopkins et al. |
| 2011/0320237 | A1 | 12/2011 | Beaman et al. |
| 2012/0221369 | A1 | 8/2012 | Braatem et al. |
| 2012/0304088 | A1 | 11/2012 | Kho et al. |
| 2013/0067024 | A1 | 3/2013 | Vasters |
| 2013/0144672 | A1 | 6/2013 | Chakra et al. |
| 2013/0246526 | A1 | 9/2013 | Wu et al. |
| 2013/0290058 | A1 | 10/2013 | Gray et al. |
| 2013/0298043 | A1 | 11/2013 | Bailey |
| 2014/0172483 | A1 | 6/2014 | Bellers et al. |
| 2014/0229560 | A1 | 8/2014 | Gray |
| 2014/0278675 | A1 | 9/2014 | DeLuca et al. |
| 2014/0282005 | A1* | 9/2014 | Gutowitz ............ G06F 3/0488 715/728 |
| 2014/0310045 | A1 | 10/2014 | Meltzer et al. |
| 2015/0058425 | A1 | 2/2015 | Nathan et al. |

OTHER PUBLICATIONS

Borestein et al. "MIME (Multipurpose Internet Mail Extensions) Part One: Mechanisms for Specifying and Describing the Format of Internet Message Bodies" Sep. 1993.
International Search Report and Written Opinion issued in PCT Application No. PCT/US2016/049409 dated Nov. 10, 2016.
"Recurring Outlook Appointments with an Irregular Pattern", Published on: Mar. 21, 2014, Available at: http://www.alandaletraining.com/free-tips/recurring-outlook-appointments-with-an-irregular-pattern.
"Before your Calendar Appointments are Migrated to the New Exchange Service", Retrieved on: Jul. 8, 2015, Available at: http://reports.is.ed.ac.uk/areas/itservices/colltools/exseed/help-and-support/migrations/exchange-premigration.pdf.
Glover, Ken, "Dealing with Documents for Irregularly Recurring Meetings", Published on: Apr. 13, 2012, Available at: http://words.usask.ca/sharepointsig/2012/04/13/dealing-with-documents-for-irregularly-recurring-meetings/.
"WebEx Meeting Center User Guide", Published on: Aug. 1, 2014, Available at: http://www.cisco.com/c/dam/en/us/td/docs/collaboration/meeting_center/wx_mc_host_ug.pdf.
"Irregular Recurring Appointments and Meetings", Published on: Jul. 7, 2011, Available at: http://www.msoutlook.info/question/549.
"Irregular Recurring Meetings", Retrieved on: Jul. 8, 2015, Available at: http://www.tru.ca/_shared/assets/irregular_recurring_meetings28463.pdf.
Hollington, Jesse, "Scheduling Irregularly Recurring Events", Published on: Oct. 19, 2012, Available at: http://www.ilounge.com/index.php/articles/comments/scheduling-irregularly-recurring-events.
International Search Report and Written Opinion issued in PCT/US2016/049348 dated Jan. 24, 2017.
U.S. Appl. No. 14/842,013, filed Sep. 1, 2015, Singh et al.
U.S. Appl. No. 14/842,023, filed Sep. 1, 2015, Singh et al.
U.S. Appl. No. 14/842,084, filed Sep. 1, 2015, Singh et al.
U.S. Appl. No. 14/842,097, filed Sep. 1, 2015, Singh et al.
"Recurrence Patterns and EWS", Published on: Sep. 3, 2014. Available at <<https://msdn.microsoft.com/en-us/library/office/dn727655(v=exchg.150).aspx>>.
"Create a Repeating Event", Published on: Apr. 25, 2013. Available at <<http://support.google.com/calendar/answer/37115?hl=en>>.
Nomura, et al., "A Practical Calendaring System Conforming with Ambiguous Pattern of Recurring Tasks", In Proceedings of 14th International Conference on Network-Based Information Systems, Sep. 7, 2011, pp. 553-558.
Lefkovics, William, "How can I establish recurring meetings with variations in Microsoft Outlook?", Published on: Sep. 29, 2011. Available at <<http://windowsitpro.com/outlook/q-how-can-i-establish-recurring-meetings-variations-microsoft-outlook>>.
Sen, et al., "Satisfying user Preferences while Negotiating Meetings", In International Journal of Human-Computer Studies, vol. 47, Issue 3, Sep. 1997, 34 pages.
International Search Report and Written Opinion issued in PCT Application No. PCT/US2016/049347 dated Nov. 30, 2016.
Linthicum "Enterprise Application Integration: Chapter 13: Message Brokers and B2B Application Integration" May 1, 2000, pp. 231-236.
International Search Report and Written Opinion issued in PCT Application No. PCT/US2016/049344 dated Dec. 7, 2016.
Microsoft: "How to: Create a Recurring Series by using EWS in Exchange", Documentation online of Office Dev. Center, Mar. 9, 2015, pp. 1-8.
Microsoft: "How to: Update a Recurring Series by using EWS in Exchange", Documentation online of Office Dev. Center, May 30, 2014, pp. 1-5.
Microsoft: "How to: Update a Recurring Series by using EWS", Documentation online of Office Dev. Center, May 7, 2014, pp. 1-5.
Microsoft: "How to: Access a Recurring Series by using EWS", Documentation online of Office Dev. Center, Mar. 9, 2015, pp. 1-7.
Microsoft: "Recurrence Patterns and EWS Learn About Recurrence Patterns and Recurring Series in Exchange" Documentation Online of Office Dev. Center, Mar. 9, 2015, pp. 1-9.
Microsoft: "Calendars and EWS in Exchange" Documentation Online of Office Dev. Center, Mar. 9, 2015, pp. 1-4.
Smith "Exchange Server 2016 Architecture", Microsoft TechNet, May 5, 2015, pp. 1-8.
Second Written Opinion Issued in PCT Application No. PCT/US2016/049347, dated Mar. 6, 2017, 6 Pages.
U.S. Appl. No. 14/842,084, filed Apr. 6, 2017, Office Action.
Office Action dated Jul. 17, 2017 cited in U.S. Appl. No. 14/842,023 (Copy Attached).
Second Written Opinion Issued in PCT Application No. PCT/US2016/049409 dated Jun. 23, 2017.
"Second Written Opinion Issued in PCT Application No. PCT/US2016/049348", dated May 12, 2017, 7 Pages.
Second Written Opinion Issued in PCT Application No. PCT/US2016/049346 dated Aug. 17, 2017.
U.S. Appl. No. 14/842,013, dated Jul. 25, 2017, Office Action.

\* cited by examiner

|  | Monday | Tuesday | Wednesday | Thursday | Friday |
|---|---|---|---|---|---|
| 10 AM | Metadata for the Series — 212 | | | | |
| 11 AM | | | | | |
| 12 PM | Instance 216-1 | | Instance 216-2 | | |
| 1 PM | | | | Instance 216-3 | |
| 2 PM | | | | | |

EMAIL PARKING LOT

BACKGROUND

Background and Relevant Art

Computers and computing systems have affected nearly every aspect of modern living. Computers are generally involved in work, recreation healthcare, transportation, entertainment, household management, etc.

In computing systems, when a set of informational messages is sent to a user, often the messages in the set have a particular order that should be maintained for the messages. For example, a set of messages may have a temporally ordered context. For example, consider a case where a set of messages includes messages for a series of calendar events. In this case, if messages are received out of order, the user may not have the appropriate context and a received message may serve to confuse the user. For example, if a user received a notification for a follow-up meeting before receiving a notification for the predicate meeting, the user may be confused about the notification for the follow-up meeting without the context of the predicate meeting.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a system for ordering a series of messages when there is a possibility that the messages will be received out of order. The system includes a temporary storage container configured to store a plurality of messages in a series of messages in anticipation of receiving a master message. The system further includes a destination container accessible by a user. The system further includes an ordering tool coupled to the temporary storage container and the destination container, wherein the ordering tool is configured to order the messages in the series of messages in the temporary storage container according to the master message, once received, and to move the plurality of messages from the temporary storage container to the destination container according to the ordering defined in the master message.

One embodiment illustrated herein includes a method that may be practiced in a computing environment. The method includes acts for ordering a series of messages when there is a possibility that the messages will be received out of order. The method includes receiving a plurality of messages in a series of messages. Each of the messages in the plurality of messages is stored in a temporary storage container; in anticipation of receiving a master message. A master message is received. The master message defines an ordering for the plurality of messages. The messages in the series of messages from the temporary storage to a destination container accessible by a user according to the ordering defined in the master message.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
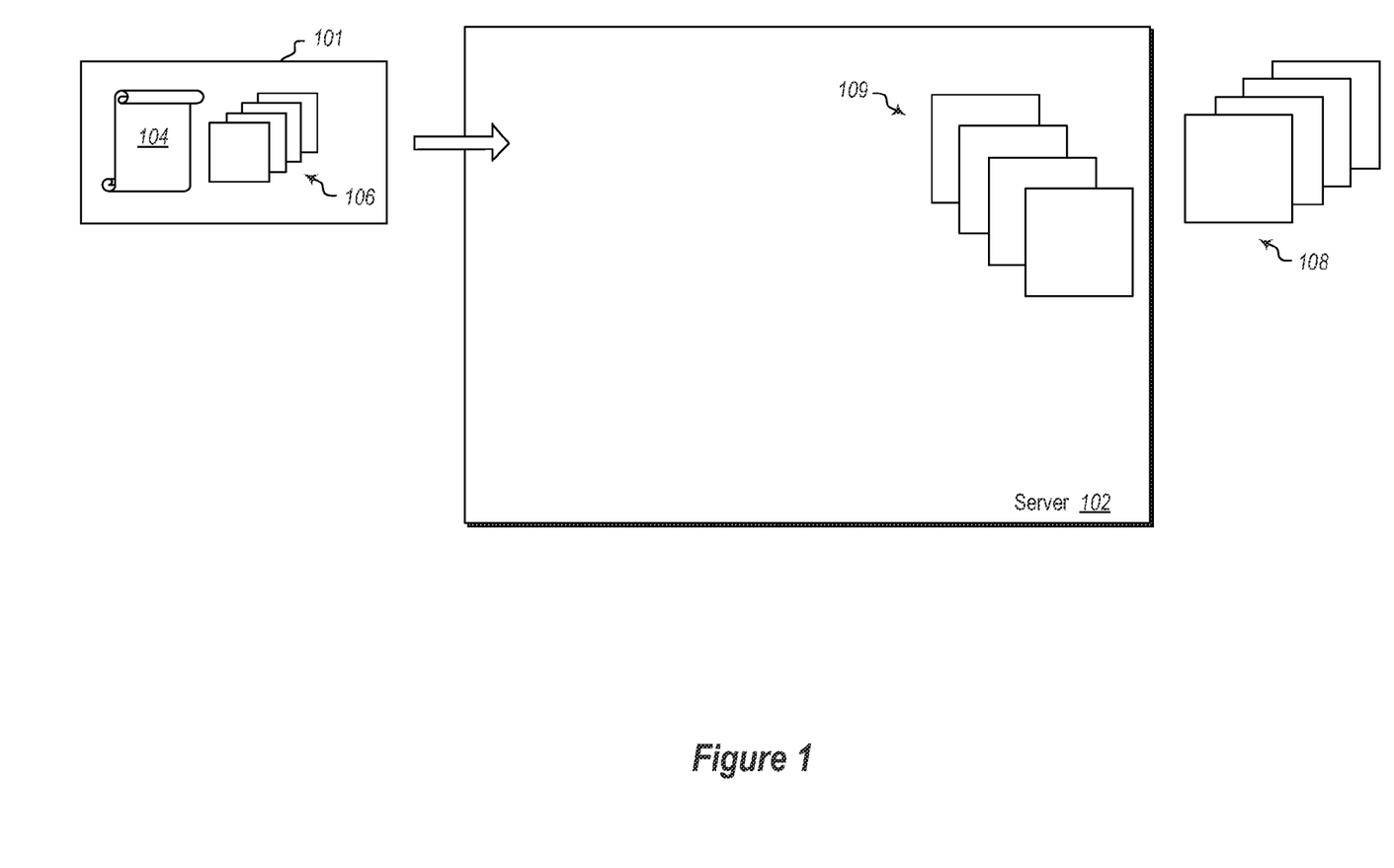
FIG. 1 illustrates an email server configured to order messages.

Some embodiments described herein implement a system for ordering a series of messages when the messages in the series of messages may be received out of order. That is, embodiments can address issues where there is no guarantee that messages will be received in order. Embodiments can accomplish this functionality by using a master message for a series of instance messages where the master message identifies the order for the instance messages in the series of instance messages. For example, FIG. 1 illustrates a server 102. The server comprises a set of mailboxes 109 for clients 108. The server 102 may receive a series of messages 101. The series of messages 101 includes a master message 104 and a plurality of instance messages 106. The instance messages 106 may be ordered messages that have a particular order to them. The master message 104 includes information identifying the order of the messages in the series of messages 101.

Figure 2:
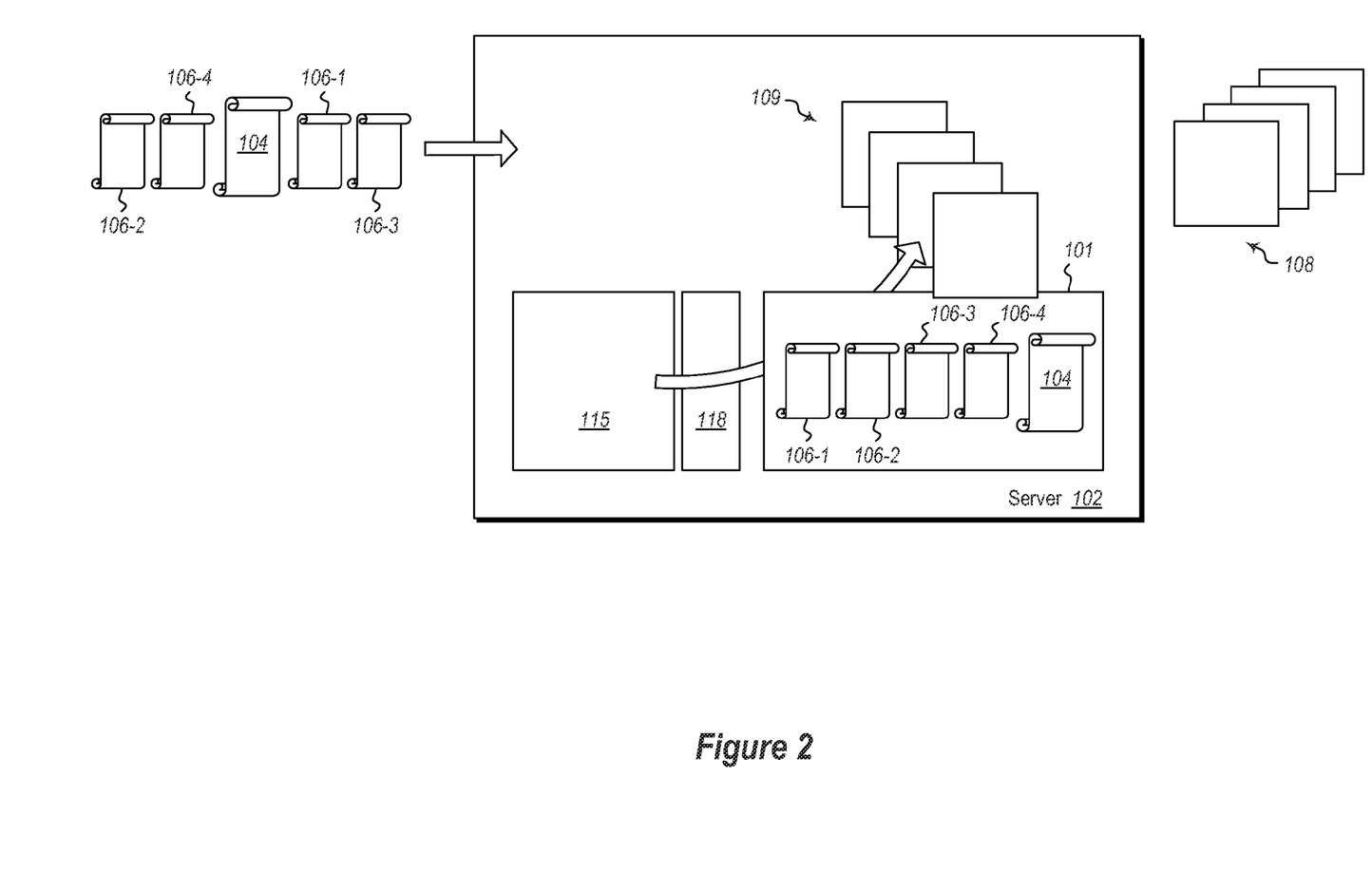
FIG. 2 illustrates additional details of the email server configured to order messages.

However, as illustrated in FIG. 2, messages in the series of messages 101 may be received out of order. FIG. 2 illustrates that message 106-3 is received, followed by message 106-1, followed by the master message 104, followed by message 106-4, followed by message 106-2. Thus, the master message 104 may be received by a system after one or more of the other instance messages in the series of messages 106.

To address this, embodiments may store instance messages 106 in a series of messages in a temporary storage container 115 such as a temporary mailbox. The instance messages 106 in the series of instance messages may be stored in the temporary storage container until the master message 104 is received. Once the master message 104 is received, the master message 104 can be used to order other instance messages in the series of messages 101. Once the instance messages 106 have been ordered, they can be provided to the user. This may be done, for example by sending the series of messages 101 to the mailboxes 109 where they can be accessed by the clients 108.

In some embodiments, the temporary storage container 115 may not be accessible to a use e.g., the clients 108 may not be able to access the temporary storage container 115). However, in some embodiments, the temporary storage container 115 may be available to the user, but the user is made aware that the instance messages are ordered instance messages and that there is not currently sufficient ordering context, i.e., the master message 104 has not yet been received, for the instance messages 106 in the set of instance messages to be properly ordered.

For example, the temporary storage container 115 may be on a mail server, and may include an additional set of mailboxes for clients 108. However, mailboxes in the temporary storage container 115, while accessible by clients, would be known to have incomplete information. Users at each the clients 108 could access a corresponding mailbox for the client in the temporary storage containers 115.

Ordering the instance messages can be done in a number of different ways. In some embodiments, using the master message 104, an ordering tool 118 can identify whether or not all of the instance messages in the series of instance messages 101 have been received. Once all instance messages are received, the series of instance messages 101 can be released to a user. This may be done by providing all of the instance messages in the series of instance messages, in their correct order, to a user repository, such as a user mailbox (for example, the mailboxes 109) or other repository. Alternatively, the instance messages may be provided one at a time to the user according to the order specified in the master message.

In an alternative embodiment, the master message 104 may be used by an ordering tool 118, which may be a data processing service at the server 102, to provide instance messages in the series of instance messages to a user, such as for example to a mailbox or other repository at the server accessible to the client, as soon as they are in order to be provided to a user. For example, some embodiments may be implemented where all instance messages must be received in order. In such a system, once the master message arrives at the system, there are at least two different scenarios that may occur.

In the first scenario, the first instance message in the series, and potentially a set of one or more immediately subsequently ordered instance messages (i.e., there are no intervening instance messages that have not yet been received in the set of one or more immediately subsequently ordered instance messages), may already have arrived at the system. In this case, the system can move the first instance messages and the set of one or more immediately subsequently ordered instance messages (to the extent that the set exists) to a user mailbox accessible by the user at a client. However, if one or more instance message are missing in the series, any already received instance messages that should be ordered after the missing instance messages will not be moved to the mailbox until the missing instance messages are received at the system. Thus, an instance message is only provided to users for access when all other instance messages ordered before the instance message have been sent.

In the second scenario, while other instance messages may have been received, the first instance message in the series has not been received by the system. Thus, the system will wait until the first instance message, as identified in the master message 104, has been received before moving the instance messages to the mailbox. Once the first instance message has been received, sending instance messages to the user can proceed as described above in the first scenario.

In an alternative embodiment, no instance messages are provided to the user until all instance messages in the series can be provided to the user in the appropriate order. In this scenario, in the particular example illustrated in FIG. 2, the master message 104 and all instance messages in the series of messages 101 are moved from the temporary storage container 115 to the mailboxes 109 as a group, in order, so that the clients 108 have access to all of the messages in the series of messages 101 together in order or none of the messages in the series of messages 101. Note that each client has a corresponding mailbox. Thus, a copy of the series of messages 101 will be placed in each mailbox for each client.

Some embodiments may be practiced in an environment where a system attempts to accommodate non-pattern recurrence (NRP) for calendar meeting messages. Non-pattern recurrence is explained in more detail below. However, briefly, non-pattern recurrence is related to the ability for some modern systems to accommodate calendar items which allow advanced scheduling features, such as the ability to have exceptions for appointments in a series of appointments, modify individual appointments in a series of appointments, add additional appointment instances to a series of appointments, collaborate on appointment details, etc. in some situations a server may have this functionality enabled and modern clients can make use of the functionality while legacy clients and/or other legacy servers are unable to make use of the functionality.

One solution that has been developed is to create a new message for every instance in a series of calendar meeting messages. This results in a series of messages which includes N+1 messages (e.g., the master message 104 and the series messages 106) sent to attendees of the meetings for the series of calendar meeting messages. As discussed above and as discussed below for non-pattern recurrence), for maintenance of temporal context there may be a need for a certain order for the calendar meeting messages to arrive at an attendee end to provide a seamless user experience. Attendees that are able (by virtue of using a modern client that uses a modern calendar API) interact only with series level messages (e.g., the master message 104) without needing to be presented with instance messages (e.g., instance messages 106).

However, as illustrated above a mechanism is implemented that detects that messages for a series operation are coming out of order and can hold up instance messages and deliver them after a series master message is delivered. The messages are parked in a spare location, such as a separate folder, which is typically (although not always) not visible to the user. Once the master message arrives, these parked messages are released and delivered to the mailboxes.

The following now illustrates additional details related to a framework in which embodiments may be implemented. In particular, the following illustrates a example of a modern system that is configured to natively implement non-pattern recurrence messages but to still allow legacy clients to also use such functionality using their legacy mechanisms.

Embodiments may be implemented in a framework where there is a creation of a series of meetings that does not have a recurrence pattern. Unless explicitly stated, anything that applies to a traditional recurring series applies here as well. For example, an organizer should be able to: add an attendee to all instances; add an attendee only to one instance; cancel the whole series; cancel only one instance in the series; set the location for the whole series; change the location only in one instance; etc.

Conversely, in the illustrated example, operations that are not allowed on a recurring series (like adding an existing meeting to a series) will not be allowed here. One exception to this rule is the ability to have multiple instances on the same day (which is not currently allowed, for a recurring series).

Using the functionality set forth herein, legacy clients will be able to see all instances of the series without changing their implementation. However, in the illustrated examples, they will be seen as individual appointments because in some legacy schema, it is not possible to represent such instances as a single appointment.

Figure 3A:
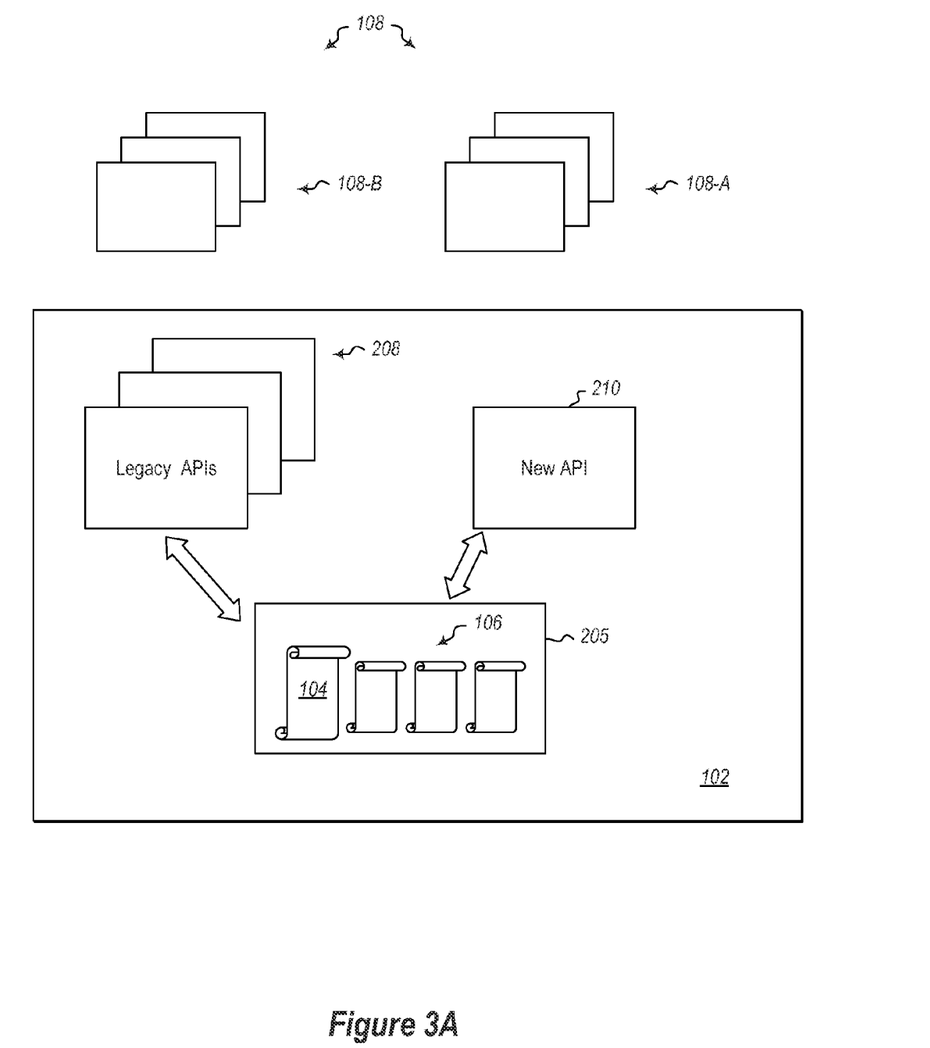
FIG. 3A illustrates a modern server that facilitates legacy clients.

Referring now to FIG. 4A, an example is illustrated which illustrates a single calendar folder 205. Both modern clients 108-A and legacy clients 108-B connect to this folder 205 on the server 102. But for legacy APIs 208 used by legacy clients, the server 102 hide the series master 104. The legacy clients can see the instance messages, where they can get default information and exception information on an event by event basis. Modern clients 108-A, using the new API can see both the series master 104 to obtain default information for the entire series of events and the instance messages 106 to obtain exception information for each event.

Figure 3B:
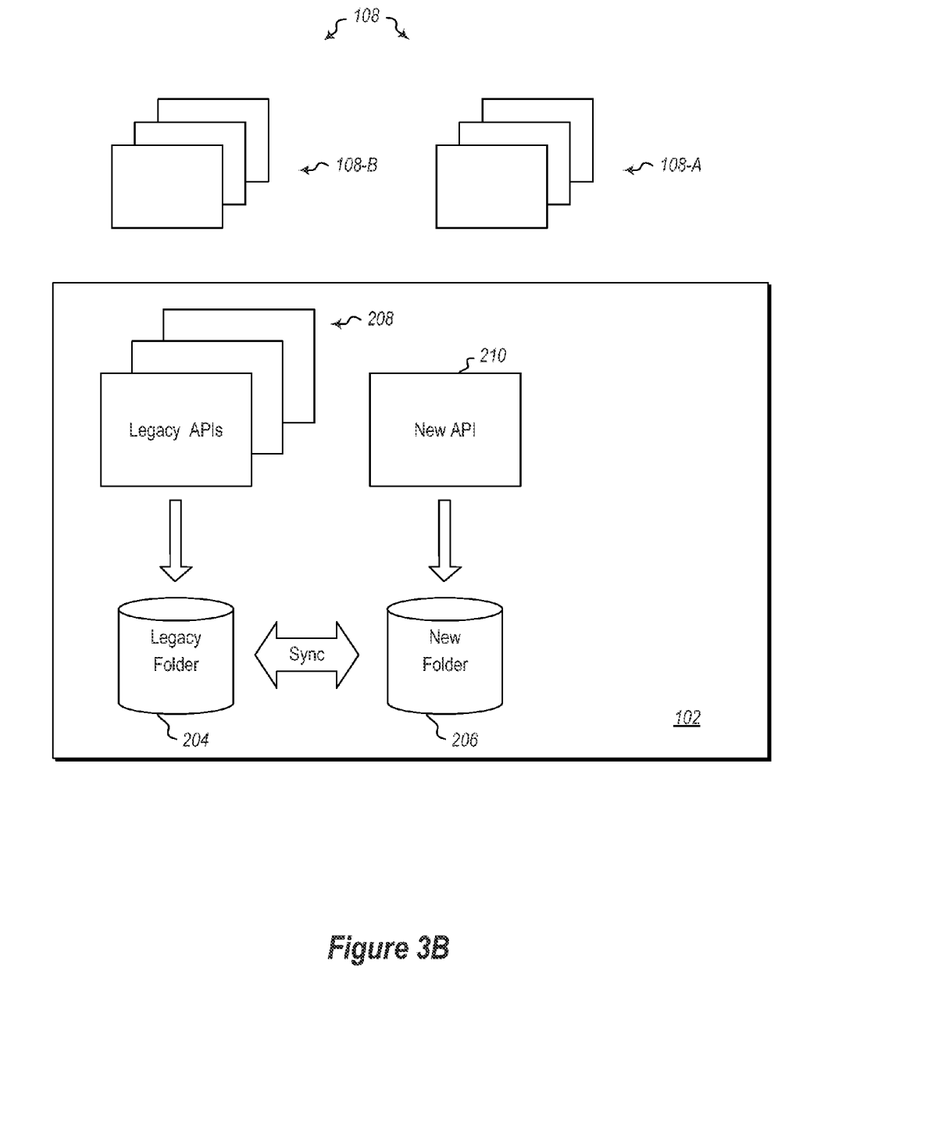
FIG. 3B illustrates a modern server that facilitates legacy clients.

Referring now to FIG. 4B, an alternative example is illustrates which illustrates a server 102 is illustrated with two calendar folders. A first legacy calendar folder 204 for legacy clients using legacy APIs 208 and a second new calendar folder 206 is for clients that use a new API 210.

The legacy calendar folder 204 continues to store items according to a legacy schema in a way that legacy clients can understand the items. For example, for legacy clients that do not understand non-pattern recurrences, these items will be stored as single items (such as the instance messages 106) instead of as part of a non-pattern recurrence series (such as the master message 104). The legacy calendar folder 204 will remain visible to legacy clients 108-B and they will interact with it in the same way that they have previously interacted with the legacy calendar folder 204.

The legacy calendar folder 204 will not be visible to modern clients 108-A, and the modern clients 108-A will not communicate with the legacy calendar folder 204. Instead, the modern clients 108-A will use the new calendar folder 406 with a new schema. This folder is not visible to the legacy clients 108-B (since it will contain items stored in a different way, which would not be understood by legacy protocols). It will only be accessible through the new API 210 and not through legacy APIs 208. Therefore, any details of how data is represented will be completely abstracted from clients. For example, non-pattern recurrences will be stored with a representation that has all the desired semantics and that will be exposed via the new API 210.

A sync mechanism to keep data updated on both folders may be implemented.

The following illustrates details regarding storing a non-pattern recurrence. Previously, a recurring series in a legacy system, such as a legacy Exchange Server from Microsoft Corporation of Redmond, Wash. has a top-level master which has information about the recurrence pattern, exceptions and is also used to represent the first instance of the series.

In contrast, a modern system may include an object (e.g., the master message 104) solely responsible for representing the on-pattern recurrence. It holds the following pieces of data:

The properties that are common to all instances (unless they are exceptions of course);

Information about when the series starts and when the series ends; and

A link to the instances of the non-pattern recurrence.

Figure 4:
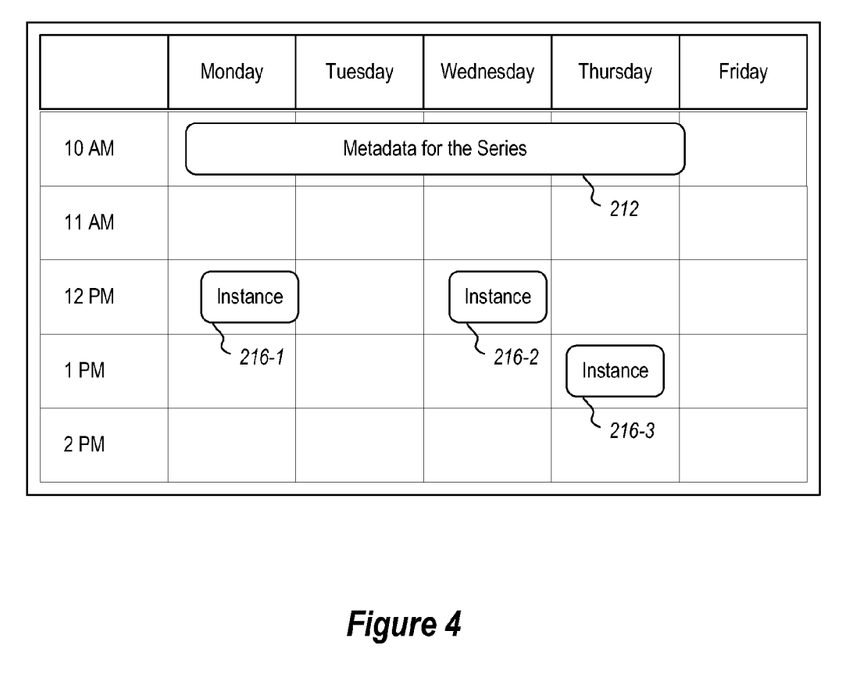
FIG. 4 illustrates a calendar view.

A difference between the non-pattern recurrence master and the "traditional recurring series" master is that this item is just metadata and only meant to be consumed by a modern server, such as a modern Exchange server available from Microsoft Corporation of Redmond, Wash. (and therefore it isn't visible to clients, modern or legacy). For example, FIG. 4 illustrates a representation of a non-pattern recurrence with instances 216-1, 216-2, and 216-3 on Monday, Wednesday and Thursday respectively. Only these items are visible to client. In some embodiments, during a calendar view embodiments internally query for both instance messages 106 and master messages 104 and then merge data from the master message 106 with instance data to get the latest state of the instance in case background propagation has not yet caught up). At this point only instances are returned from calendar view API call.

Note that the item 212 holding the metadata begins on the same day of the first instance and ends at the last day. This allows for a more efficient query when obtaining a calendar view.

On legacy systems, when a client requests a view, two queries are made to the server 102: one for single and one for recurring items. Single item retrieval is simple: the legacy system can simply request the items that are in the desired window based on their start and end dates. When recurring items are in the picture, however, the server 102 has to examine the entire calendar and filter items in memory. This is because data for the series master also doubles as the first item—and therefore may be outside of the query window.

In contrast, in the non-pattern recurrence model, this is resolved by having the data related to the start and end of the series in the item 212 that represents the series. Since it stretches and shrinks with the instances, it is always in the same window as the instances 216-1, 216-2 and 216-3. This detail allows modern systems to have one single query and have every object of interest returned by it with no need to filter anything in memory.

As explained above, in one alternative embodiment, there are two calendar folders (i.e., a legacy calendar folder 204 and a new calendar folder 206), accessed by different clients (i.e., legacy clients 108-B and modern clients 108-A respectively). The two calendar folders have the same data (but represented in different ways as appropriate for the different clients).

Each time a modern client writes to the new calendar folder 206, an equivalent operation is executed against the legacy calendar folder 204 (and vice-versa). As each folder has a different data model, an operation cannot be simply replayed. Instead, there is a translation into equivalent operations.

For instance, assume that, in the new model, exceptions of a recurring series are treated like top-level partial items (like in non-pattern recurrences) and that a legacy API (from among the legacy APIs 208) is creating an exception.

Conversely, if a new API 210 (which operates against the new folder 206) had created the partial item for the recurring series exception, synchronization operations would have to update the corresponding item on the legacy folder by creating an attachment.

Thus, after each create/update/delete operation, embodiments will take the object as a whole and fully update the equivalent object on the other folder.

Instances of non-pattern recurrences are full items and contain all data required for them to be displayed. This includes series information that will be used only by the modern clients 108-A and all the properties expected by legacy clients 108-B.

To guarantee the backwards compatibility, data that would be only in the master message 104 is propagated to all the instance messages 106 as illustrated above.

Creating or modifying a non-pattern recurrence as a series is done through the new API 210. In this scenario, embodiments are aware of series versus exceptions and perform bulk updates whenever appropriated. There will be a master item, which will only be understood by the new API. MAPI clients will not see it at all.

Thus, for backwards compatibility, each instance of a series will have all the properties necessary to display the item as a single item. Changes to the series as a whole (like changing the subject for all instances) will be written against the master message. Embodiments will attempt to update the other instances inline with the save. Updates that cannot be performed online (either because of failures, because there are too many instances, or for other reasons) will be done in the background process.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
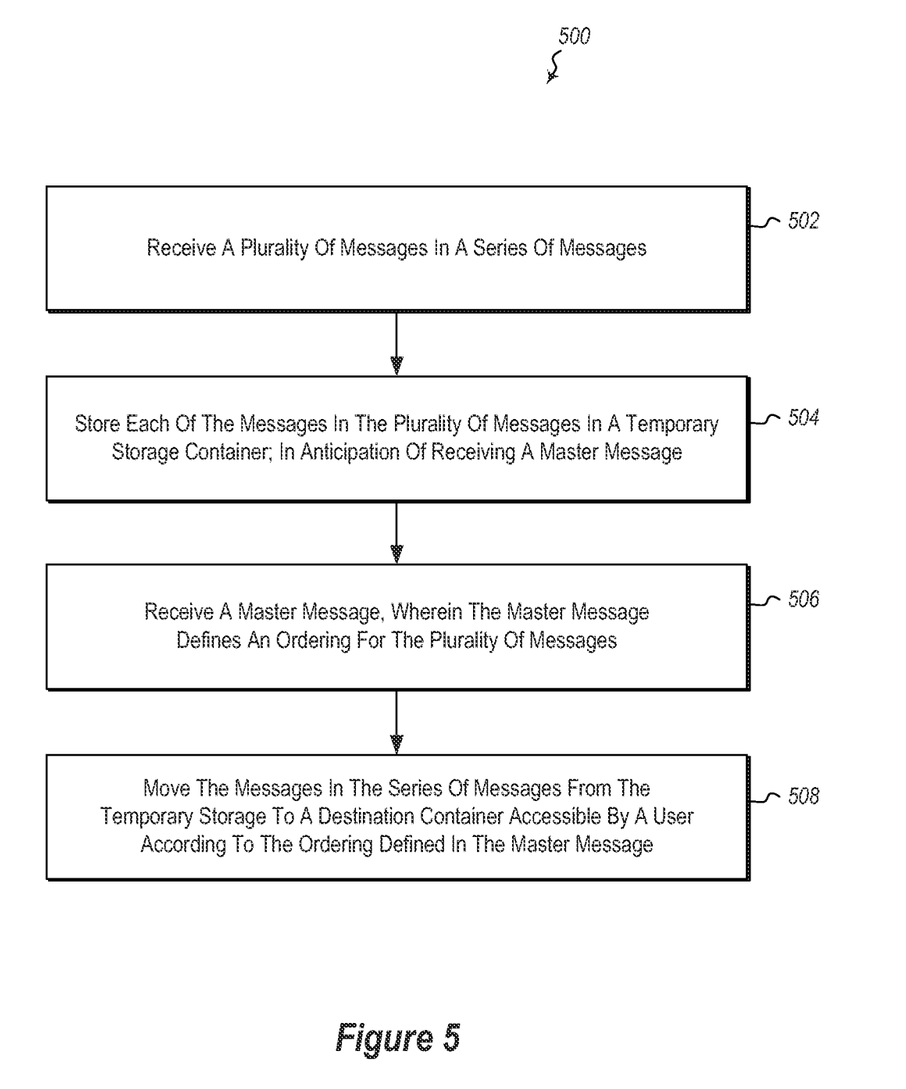
FIG. 5 illustrates a method for ordering a series of messages when there is a possibility that the messages will be received out of order.

Referring now to FIG. 5, a method 500 is illustrated. The method. 500 may be practiced in a computing environment. The method 500 includes acts for ordering a series of messages when there is a possibility that the messages will be received out of order. The method includes receiving a plurality of messages in a series of messages (act 502). For example, one or more of messages 106-1 through 106-4 may be received.

The method. 500 further includes putting each of the messages in the plurality of messages in a temporary storage container; in anticipation of receiving a master message (act 504). For example, the messages may be stored in a storage container such as the storage container 115.

The method 500 further includes receiving a master message, wherein the master message defines an ordering for the plurality of messages (act 506). For example, the master message 104 may be received, which includes ordering information for the messages 106.

The method 500 further includes moving the messages from the temporary storage to a destination container accessible by a user according to the ordering defined in the master message (act 508). For example, the messages 104 and 106 may be moved to one or more of the mailboxes 109.

The method 500 may further include preventing the user from accessing the temporary storage location. Alternatively, the method 500 may further include providing access to the temporary storage location to the user but indicating to the user that the messages in the temporary storage location lack ordering context.

The method 500 may be practiced on a server. Note that by performing the actions on a modern server, both modern and legacy clients can be accommodated. In particular, by delivering both the master message 104 and instance messages 106 both modern and legacy clients can be accommodated as modern clients can use the master message 104 and the legacy clients can use the instance messages 106.

The method 500 may be practiced on a client. In particular, some modern clients may be able to locally store the instance messages in temporary storage until the master message is received, at which time the modern client can provide the messages to a user according to the order in the master message.

The method 500 may be practiced where moving the messages from the temporary storage to a destination container accessible by a user according to the ordering defined in the master message includes moving email messages to email mailboxes.

The method 500 may be practiced where moving the messages from the temporary storage to a destination container accessible by a user according to the ordering defined in the master message includes moving calendar items in a calendar series to a user accessible mailbox.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal compute s, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and, remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims her than by the foregoing description. All changes which come within the meaning and range of equivalency of the claims are to be embraced within their scope.

What is claimed is:

1. In a computing environment, a system for ordering a series of messages when there is a possibility that the messages will be received out of order, the system comprising:
   at least one processor;
   at least one hardware storage device having stored computer-executable instructions for processing messages between a first mailbox, comprising a temporary mailbox, and a second mailbox, comprising a user-accessible mailbox;
   the temporary mailbox which is configured to store a plurality of received messages in a series of messages, the series of messages being associated with and identified by a master message, wherein the master message also identifies an ordering for the series of messages, the series of messages being stored in the temporary mailbox until at least the system receives the master message;
   the user-accessible mailbox which is configured to receive the series of messages from the temporary mailbox after the system receives the master message and to provide a user access to the series of messages;
   an ordering tool coupled to the temporary mailbox and the user-accessible mailbox, wherein the ordering tool is configured to order the messages in the series of messages in the temporary mailbox according to the ordering defined by the master message, once the master message is received, and to subsequently move the series of messages from the temporary mailbox to the user-accessible mailbox according to the ordering defined in the master message.

2. The system of claim 1, wherein the temporary storage location is not able to be accessed by the user.

3. The system of claim 1, wherein the temporary storage location is able to be accessed by the user but is configured to indicate to the user that the messages in the temporary storage location lack ordering context.

4. The system of claim 1, wherein the system is a server.

5. The system of claim 1, wherein the system is a client.

6. The system of claim 1, wherein the destination container comprises one or more email mailboxes.

7. The system of claim 1, wherein the one or more messages comprise calendar items in a calendar series.

8. In a computing environment, a method for processing messages between a first mailbox, comprising a temporary mailbox, and a second mailbox, comprising a user-accessible mailbox, the method comprising:
   receiving a plurality of messages in a series of messages, the series of messages being associated with and identified by a master message, wherein the master message also identifies an ordering for the series of messages, the series of messages being stored in the temporary mailbox until at least the system receives the master message;
   storing each of the messages in the plurality of messages in a temporary storage container in anticipation of receiving the master message, the series of messages being stored in the temporary mailbox until at least the master message is received;
   receiving the master message; and
   moving the messages in the series of messages from the temporary storage to a destination container comprising a user-accessible mailbox after the master message is received according to the ordering defined by the master message; and
   providing user access to the series of messages at the destination container according to the ordering defined in the master message.

9. The method of claim 8, further comprising preventing the user from accessing the temporary storage location.

10. The method of claim 8, further comprising providing access to the temporary storage location to the user and indicating to the user that the messages in the temporary storage location lack ordering context.

11. The method of claim 8, wherein the method is performed on a server.

12. The method of claim 8, wherein the method is performed on a client.

13. The method of claim 8, wherein moving the messages in the series of messages from the temporary storage to a destination container accessible by a user according to the ordering defined in the master message comprises moving calendar items in a calendar series to a user accessible mailbox.

14. One or more hardware storage device having stored computer-executable instructions that are executable by one or more processors of a computing system for causing the computing system to implement a method for processing messages between a first mailbox, comprising a temporary mailbox, and a second mailbox, comprising a user-accessible mailbox, the method comprising:

receiving a plurality of messages in a series of messages, the series of messages being associated with and identified by a master message, wherein the master message also identifies an ordering for the series of messages, the series of messages being stored in the temporary mailbox until at least the system receives the master message;

storing each of the messages in the plurality of messages in a temporary storage container; in anticipation of receiving the master message, the series of messages being stored in the temporary mailbox until at least the master message is received;

receiving the master message that defines the ordering for the plurality of messages; and moving the messages in the series of messages from the temporary storage to a destination container comprising a user-accessible mailbox after the master message is received; and providing user access to the series of messages at the destination container according to the ordering defined in the master message.

\* \* \* \* \*